W. B. BANDY.
DIRIGIBLE HEADLIGHT.
APPLICATION FILED FEB. 4, 1920.
1,364,066.
Patented Jan. 4, 1921.
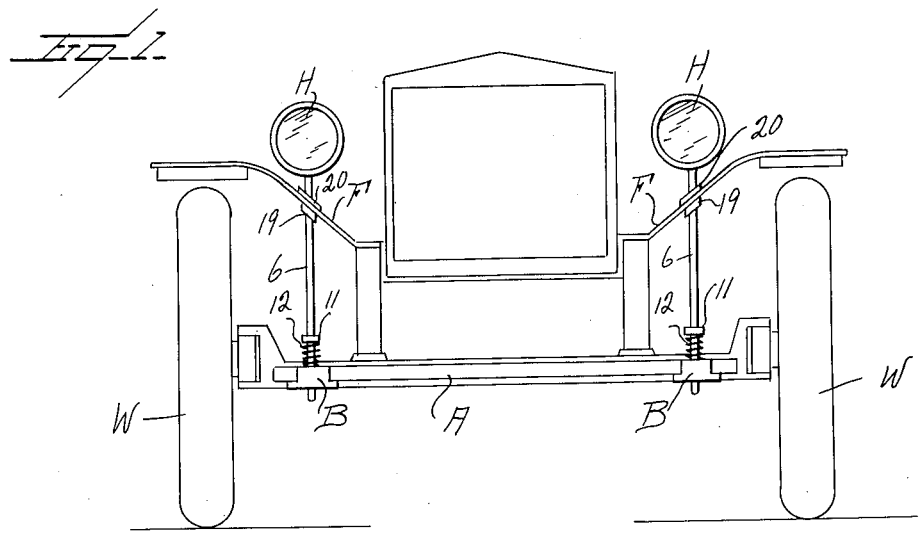
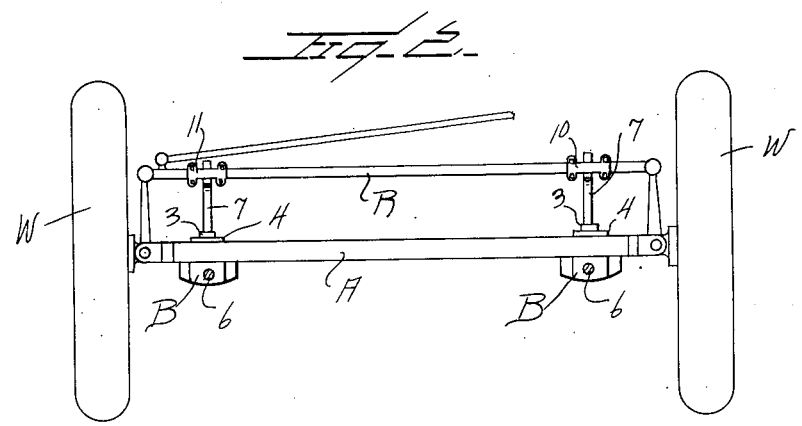
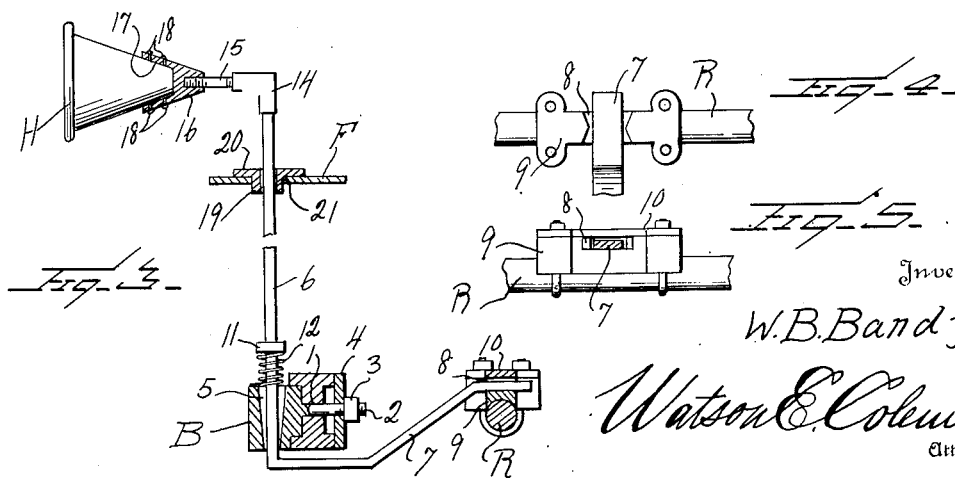
Inventor
W. B. Bandy
Watson E. Coleman
Attorney

UNITED STATES PATENT OFFICE.

WILLIAM B. BANDY, OF CROSSVILLE, TENNESSEE, ASSIGNOR OF FORTY-NINE ONE-HUNDREDTHS TO WILLIAM H. JACKSON, OF CROSSVILLE, TENNESSEE.

DIRIGIBLE HEADLIGHT.

1,364,066.     Specification of Letters Patent.     Patented Jan. 4, 1921.

Application filed February 4, 1920. Serial No. 356,133.

*To all whom it may concern:*

Be it known that I, WILLIAM B. BANDY, a citizen of the United States, residing at Crossville, in the county of Cumberland and State of Tennessee, have invented certain new and useful Improvements in Dirigible Headlights, of which the following is a specification, reference being had to the accompanying drawings.

This invention relates to certain improvements in dirigible headlights, and it is an object of the invention to provide a device of this general character having novel and improved means whereby the headlight of a motor driven vehicle or the like will be caused to swing in unison and in the same general direction as the steering wheels during the lateral movement thereof whereby the rays of the headlight are at all times thrown in the direction of travel of the vehicle.

Another object of the invention is to provide a novel and improved dirigible headlight having means whereby the rays emitted from the light are maintained automatically substantially parallel with the steering wheels in the direction when the same are turning and thereby maintaining the light where it is needed and particularly in turning curves or corners, and also whereby the necessity of the use of the dimmers is practically eliminated as the rays of the light emitted from the headlight will be deflected from an on-coming car as soon as the steering wheels are moved and at the same time directing the light rays where they are needed for the one driving the car.

The invention consists in the details of construction and in the combination and arrangement of the several parts of my improved dirigible headlight whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in front elevation illustrating a dirigible headlight constructed in accordance with an embodiment of my invention in applied position;

Fig. 2 is a fragmentary view partly in top plan and partly in horizontal section taken through the structure as illustrated in Fig. 1;

Fig. 3 is an enlarged view partly in section and partly in side elevation illustrating the mounting and operative connection with one of the headlights as herein disclosed;

Fig. 4 is a fragmentary view in top plan illustrating the connection with an arm or extension of a lamp post with the steering rod, the cap plate being removed; and Fig. 5 is a view partly in front elevation and partly in section of the structure illustrated in Fig. 4 with the cap plate applied.

As disclosed in the accompanying drawing, A denotes the front axle of a motor driven vehicle or the like and with which is engaged in a conventional manner the steering wheels W connected for unitary steering movement by the rod R.

Each end portion of the axle A has disposed laterally therethrough in a direction longitudinally of the vehicle an opening 1 and through which is directed a shank 2 carried by a bracket B, and which bracket is effectively maintained firmly against a vertical face of the axle A through the instrumentality of a clamping nut 3 threaded upon the shank 2 and having direct contact with the washer plate 4, said washer plate 4 being particularly adapted for use when the axle A is of an I formation.

The bracket B is provided with a bore 5 longitudinally disposed when the bracket B is in applied position and freely directed through said bore 5 is the lower end portion of a post 6. The lower end of the post 6 is continued by a rearwardly disposed extension or arm 7 having its rear or free end portion freely disposed within or through an elongated opening or slot 8 provided in a block 9 fixed to the rod R. The block 9 includes a removable cap plate 10 whereby the assembly of the extension or arm 7 with respect to the block 9 may be materially facilitated.

The post 6 at a predetermined distance above the coacting bracket B is provided with an enlargement or stop 11 and interposed between said stop and the upper face of the bracket B is an expansible member 12 herein disclosed as a coil spring encircling the post 6. The expansible member 12 serves as a shock absorber to compensate for the shocks and jars imposed upon the axle A incident to travel, and which member 12 also serves as an anti-rattler by constantly exerting upward pressure on the post 6 yet permitting the same to have perfect freedom in action. It is also to be noted that the bore 5 of the bracket B is of a diameter in excess of the diameter of the post 6 to facilitate the requisite freedom of action of said post 6 and particularly in the event of such posts 6 getting slightly out of line. Secured to the upper end portion of the post 6 is an elbow 14 having its upper branch forwardly directed and with which is engaged a substantially horizontally disposed rod or arm 15, preferably screwed therein. The forward or outer end portion of the rod 15 is suitably fastened to the apex portion of a substantially conical member 16. The base or outer face of the member 16 is provided with a socket 17 in which is snugly engaged the rear portion of the casing of a headlight or lamp H, said casing being preferably secured to the member 16 by the rivets 18 or the like.

Each of the posts 6 extends upwardly through the adjacent fender F of the vehicle body and more particularly through a depending sleeve 19 carried by the plate 20, said sleeve 19 fitting within a suitable opening 21 produced in the fender F. The sleeve 19 serves as a brace or reinforcement to facilitate the vertical movement of the fender with respect to the axle A due to the vibration of the vehicle body during transit or from other causes.

From the foregoing description, it is thought to be obvious that a dirigible headlight constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. In combination with an axle of a vehicle, a bearing member secured to said axle, a vertically disposed post disposed through said bearing, the bore of the bearing member being of a diameter in excess of the diameter of the post whereby said post is capable of movement transversely of the bore, yieldable means for constantly urging the post upwardly, and means for rotating the post.

2. In combination with an axle of a vehicle and the steering rod, a bearing member carried by said axle, a vertically disposed lamp post disposed through said bearing member, the bore of the bearing member being of a diameter in excess of the diameter of the post whereby said post is capable of movement laterally of said bore, the lower end portion of the post being provided with a lateral extension, the steering rod being provided with a recess in which said extension of the post is slidably engaged.

3. In combination with an axle of a vehicle, a bearing member carried thereby, a vertically disposed lamp post disposed therethrough, the bore of the bearing member being of a diameter greater than the bore of the post whereby the post has limited movement laterally of the bearing member, said post above the bearing member being provided with an enlargement, an expansible member being interposed between the top of the bearing member and said enlargement for constantly urging the post upwardly, and means for rotating the post.

In testimony whereof I hereunto affix my signature.

WILLIAM B. BANDY.